United States Patent
Fukumoto

[11] Patent Number: 5,930,034
[45] Date of Patent: Jul. 27, 1999

[54] MICROSCOPE WITH A TELESCOPIC FUNCTION AND METHOD

[75] Inventor: Satoshi Fukumoto, Machida, Japan

[73] Assignee: Nikon Corporation, Tokyo, Japan

[21] Appl. No.: 08/866,997

[22] Filed: Jun. 2, 1997

[30] Foreign Application Priority Data

Jun. 4, 1996 [JP] Japan ................................ 8-141449

[51] Int. Cl.$^6$ .......................... G02B 21/00; G02B 23/00; G02B 15/02; G02B 7/02
[52] U.S. Cl. .......................... 359/381; 359/399; 359/421; 359/672; 359/827
[58] Field of Search ................................ 359/368, 379, 359/381, 399, 407, 421, 672, 673, 827

[56] References Cited

U.S. PATENT DOCUMENTS

| | | |
|---|---|---|
| 54,542 | 5/1866 | Heath . |
| 1,128,761 | 2/1915 | Cornell ................................ 359/381 |
| 4,217,025 | 8/1980 | Takenaka ................................ 359/377 |
| 4,249,793 | 2/1981 | Uehara ................................ 359/422 |
| 5,000,556 | 3/1991 | Katsuma ................................ 359/407 |
| 5,052,788 | 10/1991 | Tachibana ................................ 359/391 |
| 5,126,549 | 6/1992 | Yamada ................................ 250/201.2 |

*Primary Examiner*—Cassandra Spyrou
*Assistant Examiner*—Mark A. Robinson
*Attorney, Agent, or Firm*—Michael N. Meller

[57] ABSTRACT

An auxiliary optical unit AU, which is removable on an object side of an objective lens of a microscope, has a built-in auxiliary lens group 15 having a negative refractive power. The auxiliary optical unit AU is provided with a focal point adjustment mechanism which shifts the auxiliary lens group 15 in the optical axial direction. By adjusting the auxiliary lens group 15, the telephoto focal point is shifted substantially to infinity when mounted to the objective lens system. The auxiliary optical unit AU is mounted so that the image plane of the auxiliary lens group alone is positioned, while the focus adjustment mechanism is focused at a substantially infinite focal point, where the object for the microscope to be observed is located.

17 Claims, 5 Drawing Sheets

MICROSCOPE WITH A TELESCOPIC FUNCTION AND METHOD

BACKGROUND OF THE INVENTION

FIELD OF THE INVENTION

The present invention relates to a microscope with a telescopic function and more specifically relates to a telescopic microscope and a method for controlling a telescopic microscope for use as a monocular telescope or as a binocular telescope by mounting an auxiliary optical member on top of an objective lens.

BACKGROUND

A microscope (optical microscope), which has been widely used for many years, generally comprises an objective lens positioned on a side of the object to be observed and an eyepiece positioned on a side of the eyes of a viewer so that a magnified image of a small object placed near a front of the objective lens may be observed. A telescope, on the other hand, has been popular for its configuration of having an objective lens and an eyepiece, which serve the purpose of magnifying an image of a far object to be observed.

SUMMARY OF THE INVENTION

These prior art microscopes and telescopes have common characteristics in that they have an objective lens and an eyepiece for observing a magnified image of an object to be observed; however, they have completely different purposes and observation methods in addition to the fact that there is a significant difference in distances between the object to be observed and the equipment of the two. This usually requires separate equipment to meet the purposes and observation methods of each.

Despite the differences in purposes and observation methods, it is an object of the present invention to provide an integrated apparatus of a microscope and a telescope that is a handy and easy-to-use optical apparatus. The present invention was devised based on this background and provides an optical apparatus which integrates a microscope and a telescope which have existed as separate apparatus in the prior art by adding an auxiliary optical member to a microscope.

Another object of the present invention is to provide an optical equipment which can be used both as a microscope (or stereoscopic microscope) and as a telescope (binocular).

To achieve these objectives, the microscope of the present invention comprises a microscope with an auxiliary optical member which is removable at the object side of the objective lens and has an auxiliary lens group having a negative refractive power; and a focal point adjustment mechanism which allows the auxiliary lens group to shift axially with respect to the objective lens system. The auxiliary optical member is mounted onto the objective lens system so that the focal point can be moved to infinity by adjusting the focal point adjustment mechanism (so that the conjugate point of an image formed by the objective lens group can be moved to infinity by adjusting the focal point adjustment mechanism). As such, being focused at infinity by means of the telescope focal point adjustment mechanism, the auxiliary optical member is attached such that an image plane of the auxiliary lens group alone is positioned on the object to be observed.

A microscope of this configuration can be used as a telescope by simply attaching an auxiliary optical member in front of the object lens system, thus an optical apparatus can be used as both a microscope and telescope. In addition, the fact that a focal point adjustment mechanism is formed on the removable auxiliary optical member allows the microscope component to have only microscopic functions. Therefore, the microscope alone can be configured to be almost the same as a conventional microscope.

Note that it is preferable that the telescopic microscope be constructed with the objective lens system comprising, in order from the object to be observed, a first and a second objective lens group each having a positive refractive power, wherein the light beams between the first and second objective lens groups are parallel, and the focal length f of the auxiliary lens group and the focal length f1 of the first object lens group satisfy the following conditional relationship:

$$-0.98 < (f/f1) < -0.2$$

Also, when the objective lens system comprises at least one of a lens group having a positive refractive power and having a plurality of lens groups having a positive refractive power whose optical beams between lens groups are non-paralle beams, it is preferable that the focal length f of the auxiliary lens group and d, a distance between the lens surface closest to the object to be observed and the object, satisfy the following conditional relationship:

$$-0.98 < (f/d) < -0.2$$

In the microscope with a telescopic function of the present embodiment, it is possible to adapt for a monocular microscope, a binocular microscope, a stereoscopic microscope having parallel optical axes, or a stereoscopic microscope having inclineoptical axes.

The microscope with a telescopic function of the present invention is formed with an optical unit for holding the objective lens system and eyepiece system, a loader on which the object to be observed is loaded, a support means for incrementally supporting the object to be observed and an optical unit, and a microscopic focal point adjustment mechanism which relatively moves the optical unit and the support means to adjust focal points for the microscope. It is preferable that the optical unit is made to be removable from the support means and is made to be removable at the side of the object of the objective lens system. Also, it can be configured such that the optical unit is rotatably attached to the support means to make it movable between positions, one being where the objective lens system faces the loader (the object to be observed) and the other being where no obstacle is observed, not being opposite the loader. In this way, the auxiliary optical member can be attached to the objective lens system when no obstacles exists in front of the objective lens system (when there is no loader in front of the objective lens system) and the microscope with a telescopic function is used as a telescope.

DRAWINGS

DETAILED DESCRIPTION

Figure 2:
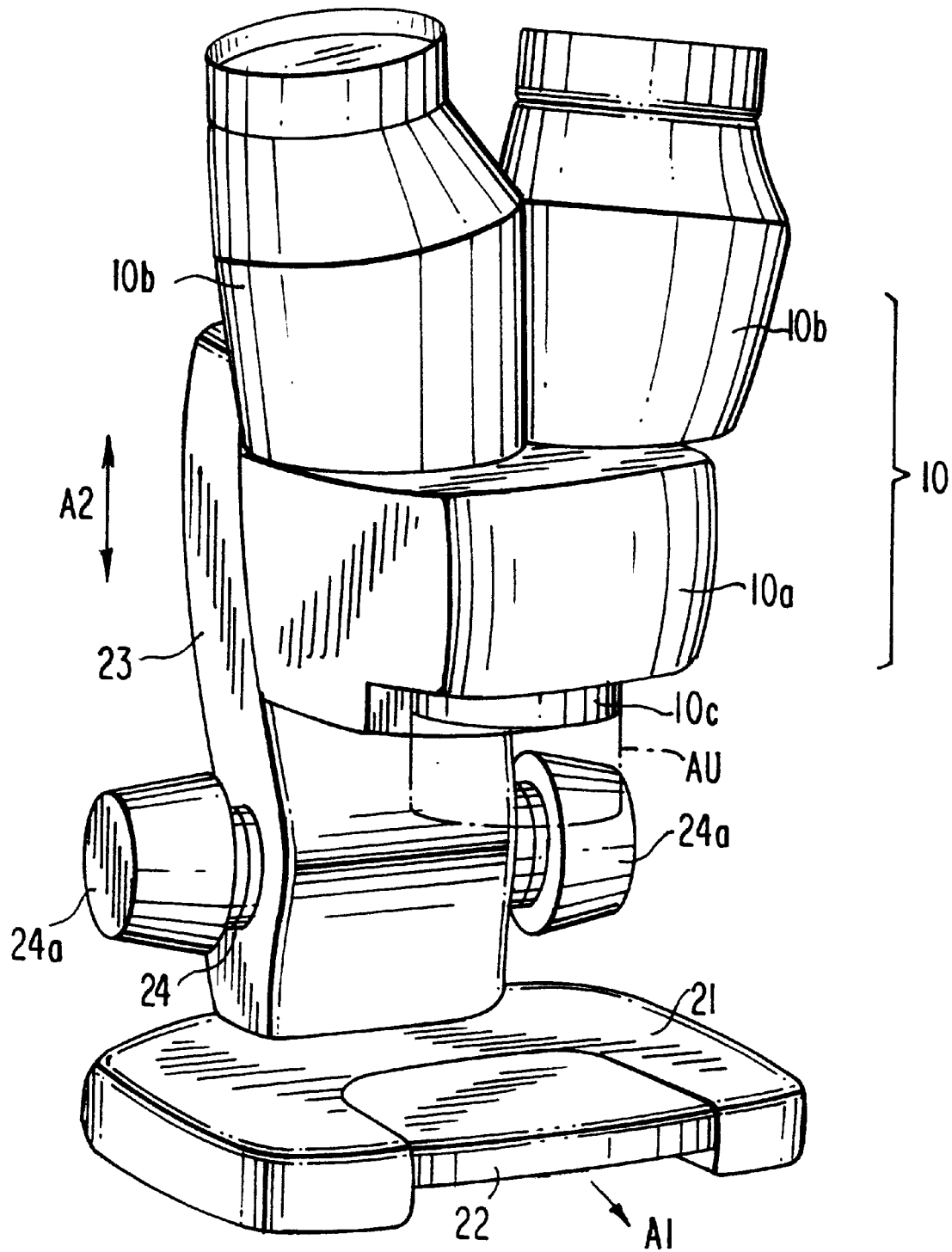
FIG. 2 is a perspective view showing an external view of the telescopic microscope.

As shown in FIG. 2, a stereoscopic microscope comprises a first housing 10a having an objective lens system; an optical unit 10 comprising an integral pair of left and right second housings 10b each of them having a prism system, an eyepiece, etc; a loader 21 having a sample plate 22, on which a sample to be observed is loaded and positioned opposite the objective lens system; a support member 23 which is movable up and down (two directions shown with the arrow A2) with respect to the loader 21 and supports the main optical unit 10; and a microscope focal length adjustment mechanism 24 which is used to move the support member 23 up and down by dialing a button 24a to adjust the focal point. A sample to be observed is loaded onto the sample plate 22, which is viewed from the side of the eyepiece system via the main optical unit 10 for the magnified image of the sample to be observed. At this time, the focal point of the microscope is adjusted by the rotation of the dial 24a, which is used to move the main optical unit 10 up and down together with the support member 23.

In the stereoscopic microscope component of this configuration shown in FIG. 2, a mounting member 10c is formed under (the surface opposite the objective lens) the first housing 10a; an auxiliary optical unit AU (shown as a two-dot chain line) is removably installable onto the mounting member 10c. The auxiliary optical unit AU has a negative refractive index which can shift the focal point of the main optical unit 10 to infinity, thus making the main optical unit 10 capable of being used as a binocular. Note that the sample plate 22 is removable to/from the loader 21 as shown with the arrow A1 and is removed when it is used as a binocular.

Figure 1:
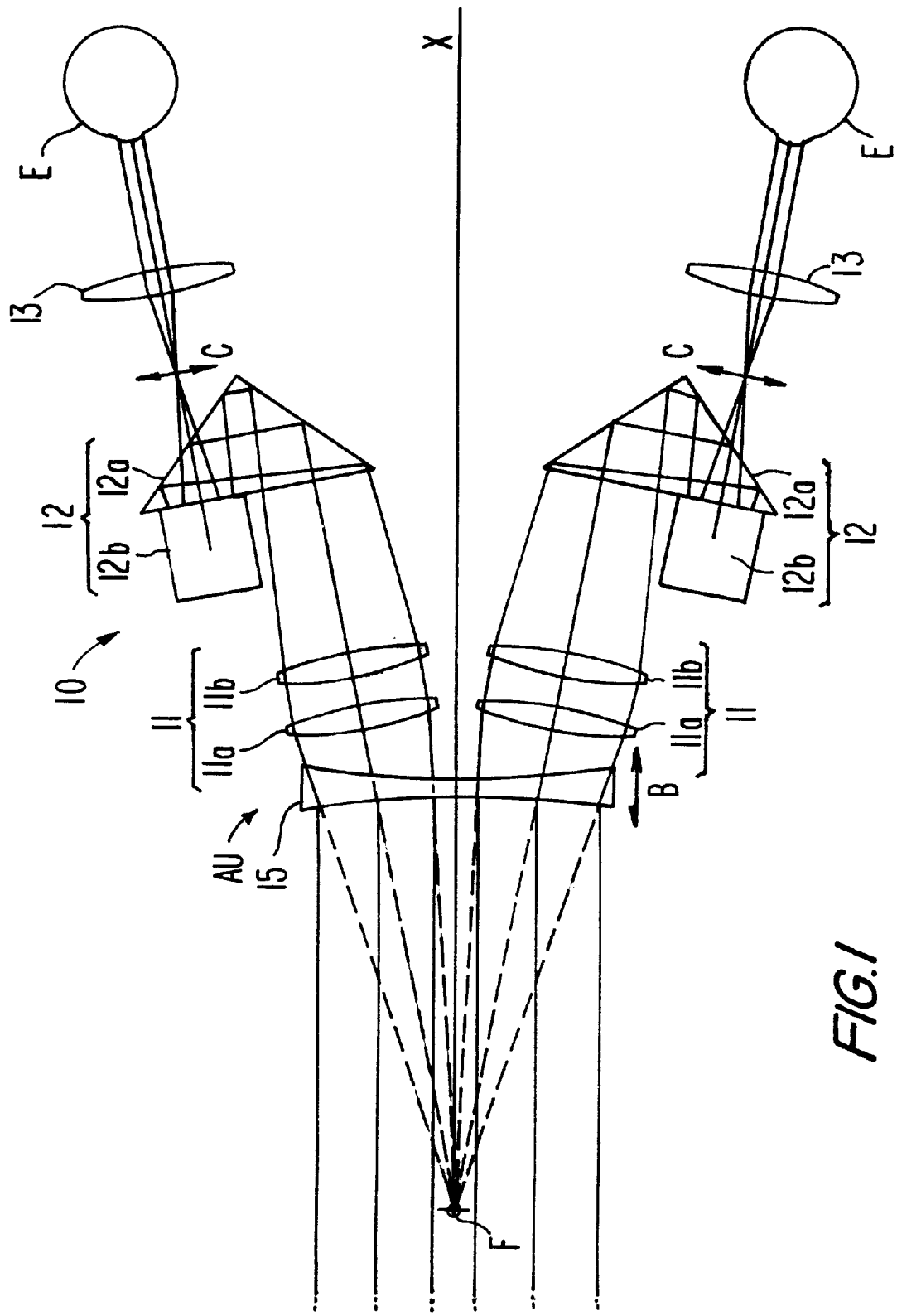
FIG. 1 is a block diagram showing a layout of the optical system of a telescopic microscope of the present invention.

FIG. 1 shows the configuration of the lens system of the main optical unit when the auxiliary lens unit AU is mounted. The main optical unit 10 configures the stereoscopic telescope such that the left and right optical axes narrow to cross at the object lens system side, comprising a left and right object lens system 11, 11a, and 11b, left and right prisms 12, 12a, and 12b, and a left and right eyepiece system 13. The auxiliary optical unit AU has a group of auxiliary lenses arranged opposite the left and right object lens system 11. Note that the object lens system 11 is configured, in order from the object to be observed, with a first and a second lens groups 11a and 11b. The oblique surface of the prisms 12 are arranged face to face and their slopes are arranged orthogonal to constitute a Porro prism.

When the auxiliary optical unit AU is not attached, the focal point on the side of the objective lens system 10 in both left and right objective lens system in the main optical unit 10 is point F. Therefore, the magnified image of the sample on the sample plate 22 can be observed via the main optical unit 10 (that is, eyes E of a viewer observes through the eyepiece system 13) by positioning the front surface of the sample plate 22 to be in a plane perpendicular to the x-axis including point F.

Figure 6:
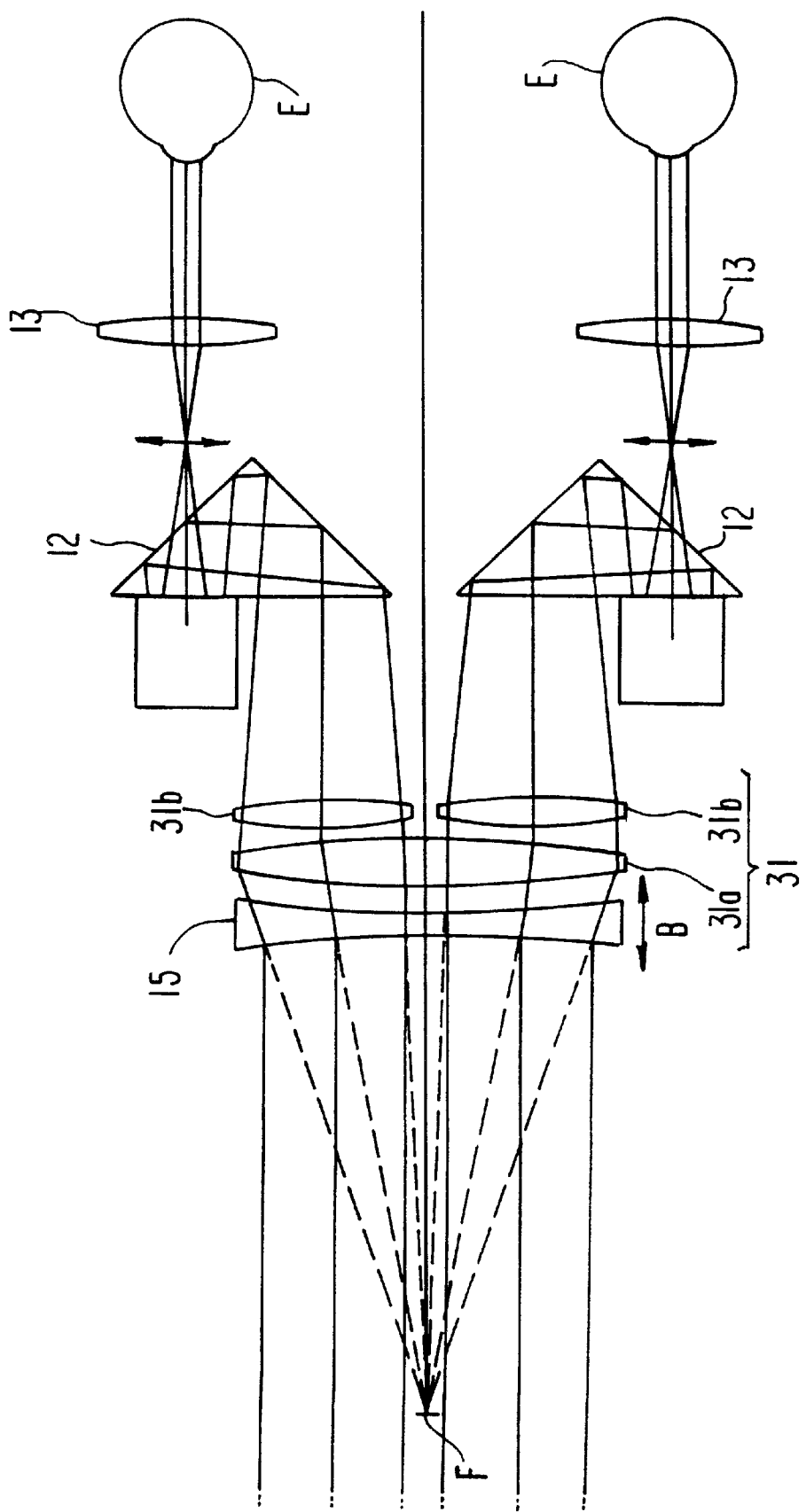
FIG. 6 is a block diagram showing a layout of the optical system of a telescopic microscope of a third embodiment of the invention.

The auxiliary lens group 15, shown in FIGS. 1 and 6, forming the auxiliary optical unit AU, comprises lenses having a negative refractive power. Therefore, when the auxiliary lens group 15 is attached, the focal point F of the main optical unit 10 shifts forward. In the present embodiment, lenses having a negative refractive power strong enough to shift the focal point F to infinity are used. In other words, when the auxiliary lens group 15 is arranged as illustrated in FIG. 6, lenses having a negative refractive power are used which are strong enough to let the focal point for the auxiliary lens group alone to overlap the focal point F of the main optical unit 10 are used.

It is necessary that the object to be observed by a binocular is not only focused at infinity but is also positioned at a finite distance. To accomplish this, as shown in FIG. 6; the auxiliary optical unit AU comprises a focal point adjustment mechanism, that shifts the auxiliary lens group 15 in the X-axial direction (arrow B) to adjust the focal point of the binocular with the movement of the auxiliary lens group 15. Note that the focal point adjustment mechanism can take any configuration as long as it shifts the auxiliary lens groups, for example, that of the focus dial of a camera.

Now a magnification ratio will be explained for use with the microscope operating as a binocular by attaching an auxiliary optical unit AU. Referring to FIG. 1, the present embodiment uses the optical system (telecentric optical system) in which an optical path between the first and the second lens groups 11a and 11b are parallel beams: the auxiliary lens group 15 and the first objective lens group 11a may be considered to be inverse Galilean optical systems, while the second objective lens group 11b and the eyepiece system 13 are considered to be Keplerian telescopes. By multiplying each of the magnification ratios, the total magnification ratio can be obtained.

Note that the inverse Galilean optical system is an optical system whose magnification becomes smaller than 1.0. If the image shrinkage effect of the inverse Galileo optical system increases too much, it cannot be a practical telescope (binocular). Considering the ratio between the focal point f of an auxiliary lens group 15 and the focal length f1 of the first object lens group (f/f1), without satisfying the conditional relationship of at least (f/f1)<−0.2 (the focal length takes a negative value because the auxiliary lens group 15 is a concave lens), it is difficult to obtain a practical telescope (binocular). Note that a value becoming larger (an absolute value becoming smaller) represents the fact that the focal length of the auxiliary lens group 15 is becoming shorter. It is preferable to make the value smaller in view of aberration corrections (to make an absolute value larger) satisfying the conditional relationship of (f/f1)<−0.4. Making (f/f1)<−0.5 is even more preferable.

It is necessary to have the auxiliary lens group 15 closer to the first objective lens group 11a such that the focal point of the auxiliary lens group 15 overlaps the focal point F. However, a certain amount of air space needs to be provided between the first objective lens group 11a and the auxiliary lens group 15. In order to satisfy the condition, at least (f/f1)>−0.98 needs to be satisfied. Preferably, (f/f1)>−0.9 should be satisfied. Making (f/f1)>−0.85 is even more preferable.

In short, at least the following conditional relationship needs to be satisfied:

$$-0.98 < (f/f1) < -0.2 \qquad (1)$$

It is preferable to satisfy the following relationship:

$$-0.9 < (f/f1) < -0.4 \quad (2)$$

It is desirable to satisfy the following relationship:

$$-0.85 < (f/f1) < -0.5 \quad (3)$$

In the above embodiment, the objective lens system is formed with an optical system whose light beams between lenses are parallel beams. However, the present embodiment is not limited to this; the objective lens system can be formed with an objective lens group. Also, the objective lens group can be formed with a plurality of objective lens groups having a positive refractive power formed by an optical system whose light beams between lens groups are nonparallel beams. In this case, the lens separation distance d between the lens surface of the lens group closest to the object to be observed and the focal point F of the main optical unit 10 should be used. Then, the conditional relationship obtained by replacing (f/d) with (f/f1) of the above equations (1), (2), and (3) should be satisfied.

Figure 3:
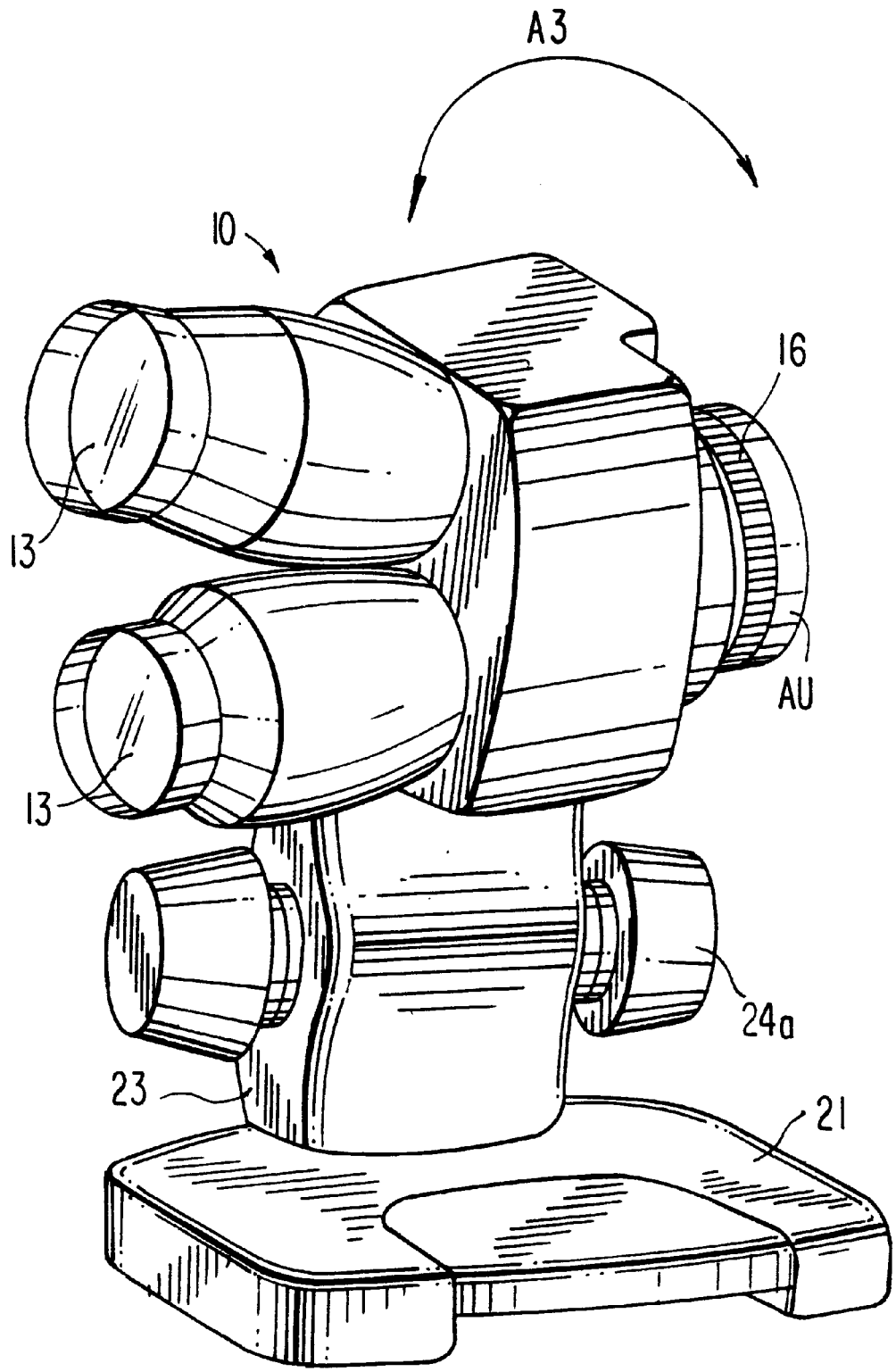
FIG. 3 is a perspective view showing the state in which the main optical unit is rotated and an auxiliary optical unit is mounted on the telescopic microscope.
Figure 4:
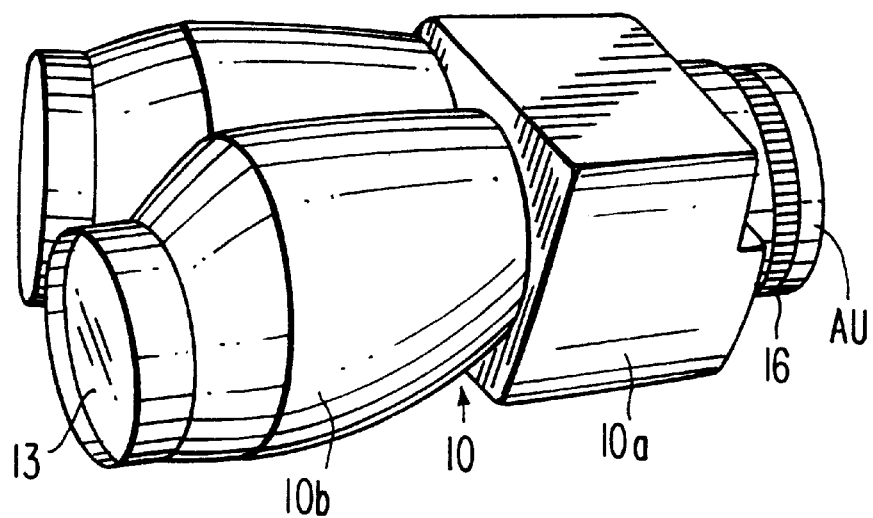
FIG. 4 is a perspective view showing the state in which the main optical unit is removed and an auxiliary optical unit is mounted on the telescopic microscope.
Figure 5:
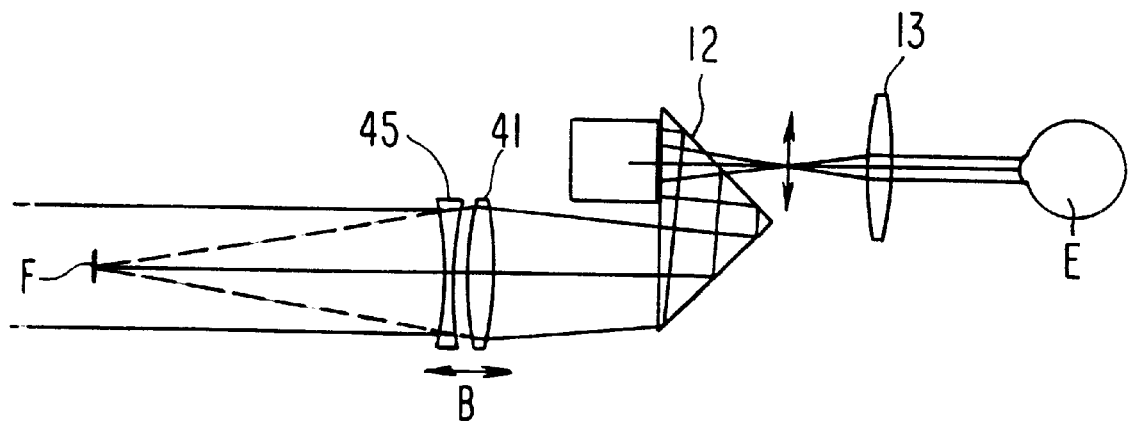
FIG. 5 is a block diagram showing a layout of the optical system of a telescopic microscope of a second embodiment of the invention

When the microscope of the present invention is used as a binocular with an auxiliary optical unit AU, the sample plate 22 should be removed as described above; the space created after removal is then used as a space for viewing the object to be observed at a far distance. Instead, the microscope can be configured such that, as shown in FIG. 3, the entire body of the main optical unit 10 is rotatably mounted onto the support member 23 in a direction of arrow A3 and the main optical unit 10 may be rotated to the position shown in FIG. 3 to be useable as a binocular. As shown in FIG. 3, a focusing dial 16 is attached onto the auxiliary optical unit AU to adjust the focusing for the binocular by rotating the dial. As shown in FIG. 4, the main optical unit 10 may be made removable from the support member 23 to remove it when the apparatus is used as a telescope when the auxiliary optical unit AU is attached.

In the above embodiment, and referring to FIG. 6, the main optical unit is formed with a stereoscopic microscope whose left and right optical axes are crossed. However, the main optical unit can be formed with a stereoscopic microscope whose left and right optical axes are parallel. In this embodiment, the first objective lens group 31a is formed with a large diameter positive lens group having an optical axis, and the second objective lens group 31b is formed with a pair of left and right positive lens groups. Note that these identical components are included in FIG. 1 and are not described.

The main optical unit may be formed with a monocular microscope having an optical axis, as shown in FIG. 6. In this embodiment, the objective lens 41 has a lens group having a positive refractive index, and the auxiliary lens group 45 is formed with a large negative lens group facing the objective lens system 41. In this embodiment also, the components identical to those shown in FIG. 1 are numbered the same.

Table 1 hereinbelow shows a specific embodiment using the stereoscopic microscope of the cross-eyed type of FIG. 1. However, the present invention is not limited to this embodiment.

TABLE 1

| (1) a first objective lens group (11a): | focal length f1 = 100 mm |
|---|---|
| (2) a second objective lens group (11b): | focal length f2 = 100 mm |
| (3) a eyepiece system (13): | focal length fe = 12.5 mm |

TABLE 1-continued

| (4) an auxiliary lens group (15): | foclal lentgh f = −80 mm |
|---|---|
| (5) f/f1: | −0.8 |
| (6) distance between the principal points of a first objective lens group 11a and an auxiliary lens group 15: | 20 mm |
| (7) magnification ratio of a microscope: | 20X |
| (8) magnification ratio of a binocular (telescope): | 6.4X |

As described, a telescopic microscope comprises a microscope with an objective lens system; an auxiliary optical member which is removable at the object side of the objective lens and has an auxiliary lens group having a negative refractive power, wherein the auxiliary optical member comprises a focal point adjustment mechanism which shifts the auxiliary lens group in the axial direction with respect to the objective lens system. The focal point adjustment mechanism is adjusted such that the auxiliary optical member can shift the focal point substantially to infinity while being mounted to the objective lens system. By only attaching an auxiliary optical member in front of the objective lens system, the apparatus can be used as a telescope. This allows a microscope to be used as a microscope and, telescope. In addition, the fact that a focal point adjustment mechanism is formed on the removable auxiliary optical member allows the microscope component to have only microscopic functions. Therefore, a microscope alone can be configured almost the same as a conventional microscope.

The present invention is not limited to the embodiments shown in the drawings but rather includes all embodiments of a microscope with a telescopic function that can be derived from any combination of the drawings, as well as the method described in the invention including any steps which can be derived from the invention.

What is claimed is:

1. A microscope with a telescopic function comprising:

a microscope with an objective lens system having a positive refractive power and an eyepiece system having a positive refractive power, said objective lens system forming an image having a conjugate point;

an auxiliary optical member which is removable at an object side of the objective lens system and has an auxiliary lens group having a negative refractive power, said auxiliary optical member having:

a focal point adjustment mechanism for shifting said auxiliary lens group in an axial direction with respect to said objective lens system such that the conjugate point of said image may be substantially adjusted to infinity and wherein said objective lens system comprises, in order from the object to be observed, a first and a second objective lens group, respectively having a positive refractive power, wherein respective optical paths of said first and second objective lens groups are parallel to each other, and a focal length f of said auxiliary lens group and a focal length f1 of said first object lens group satisfy the following conditional relationship:

$$-0.98 < (f/f1) < -0.2$$

2. The microscope, as set forth in claim 1, wherein said microscope comprises a pair of left and right eyepiece systems, each of said eyepiece systems respectively having an optical axis, and the objective lens system includes an objective lens group which overlaps each of said optical axes at least at one point.

3. A microscope with a telescopic function comprising:
a microscope with an objective lens system having a positive refractive power and an eyepiece system having a positive refractive power, said objective lens system forming an image having a conjugate point;
an auxiliary optical member which is removable at an object side of the objective lens system and has an auxiliary lens group having a negative refractive power, said auxiliary optical member having:
a focal point adjustment mechanism for shifting said auxiliary lens group in an axial direction with respect to said objective lens system such that the conjugate point of said image may be substantially adjusted to infinity, wherein an image plane of said auxiliary lens group alone is positioned where the object of said microscope to be observed is located, when said focus adjustment mechanism is focused substantially at an infinite focal point, and wherein said objective lens system comprises, in order from the object to be observed, a first and a second objective lens group, respectively, having a positive refractive power wherein respective optical paths for said first and second objective lens groups are parallel to each other, and a focal length f of said auxiliary lens group and a focal length f1 of said first object lens group satisfy the following conditional relationship:

$$-0.98<(f/f1)<-0.2$$

4. A microscope with a telescopic function comprising:
a microscope with an objective lens system having a positive refractive power and an eyepiece system having a positive refractive power, said objective lens system forming an image having a conjugate point;
an auxiliary optical member which is removable at an object side of the objective lens system and has an auxiliary lens group having a negative refractive power, said auxiliary optical member having:
a focal point adjustment mechanism for shifting said auxiliary lens group in an axial direction with respect to said objective lens system such that the conjugate point of said image may be substantially adjusted to infinity and wherein said objective lens system comprises at least one of a lens group having a positive refractive power and another lens group having a plurality of lens groups, respectively having positive refractive powers and having optical paths between lens groups which are nonparallel, wherein a focal length f of said auxiliary lens group and a distance d between a lens surface, among the lens groups forming said objective lens system closest to the object to be observed by said microscope and the object, satisfy the following conditional relationship:

$$-0.98<(f/d)<-0.2$$

5. The microscope, according to claim 4, wherein an image plane of said auxiliary lens group alone is positioned where the object of said microscope to be observed is located, when said focus adjustment mechanism is focused substantially at an infinite focal point.

6. The microscope, according to claim 4, wherein said microscope comprises a monocular microscope which forms only one optical path for observation from one objective lens system having one optical axis and one eyepiece system having one optical axis.

7. The microscope, as set forth in claim 4, wherein said microscope comprises a pair of left and right objective lens systems and a pair of left and right eyepiece systems, which form a stereoscopic microscope in which focal points of said pair of objective lens systems overlap at least at one place.

8. The microscope, as set forth in claim 7, wherein a pair of left and right optical axes are inclined toward each other so as to come closer to each other in a direction from said eyepiece system toward said objective lens system.

9. The microscope, as set forth in claim 4, wherein said microscope further comprises:
an optical unit for holding said objective lens system and said eyepiece system;
a loader on which an object to be observed is loaded;
a support means movable with respect to said loader and supporting said optical unit; and
a focal point adjustment mechanism which shifts said optical unit relative to said support means to adjust focal points for said microscope and wherein said optical unit is removably mounted onto said support means.

10. The microscope, as set forth in claim 4, wherein said microscope further comprises:
an optical unit for holding said objective lens system and said eyepiece system;
a loader on which an object to be observed is loaded;
a support means movable with respect to said loader and supporting said optical unit; and
a focal point adjustment mechanism, wherein the portion positioned on said object side of said object lens system observed on said loader is configured to be removable.

11. A microscope with a telescopic function comprising:
a microscope with an objective lens system having a positive refractive power and an eyepiece system having a positive refractive power, said objective lens system forming an image having a conjugate point;
an auxiliary optical member which is removable at an object side of the objective lens system and has an auxiliary lens group having a negative refractive power, said auxiliary optical member having:
a focal point adjustment mechanism for shifting said auxiliary lens group in an axial direction with respect to said objective lens system such that the conjugate point of said image may be substantially adjusted to infinity, wherein an image plane of said auxiliary lens group alone is positioned where the object of said microscope to be observed is located, when said focus adjustment mechanism is focused substantially at an infinite focal point, and wherein said objective lens system comprises at least one of a lens group having a positive refractive power and another lens group having a plurality of lens groups, respectively having positive refractive powers and having optical paths between lens groups which are nonparallel, wherein a focal length f of said auxiliary lens group and a distance d between a lens surface, among the lens groups forming said objective lens system closest to the object to be observed by said microscope and the object, satisfy the following conditional relationship:

$$-0.98<(f/d)<-0.2$$

12. A microscope with a telescopic function comprising:
a microscope with an objective lens system having a positive refractive power and an eyepiece system having a positive refractive power, said objective lens system forming an image having a conjugate point;

an auxiliary optical member which is removable at an object side of the objective lens system and has an auxiliary lens group having a negative refractive power, said auxiliary optical member having:

a focal point adjustment mechanism for shifting said auxiliary lens group in an axial direction with respect to said objective lens system such that the conjugate point of said image may be substantially adjusted to infinity and wherein said microscope further comprises:

an optical unit for holding said objective lens system and said eyepiece system;

a loader on which an object to be observed is loaded;

a support means adapted to be movable and coupled to said optical unit and said object for incrementally changeably supporting said object and said optical unit; and a focal point adjustment mechanism which relatively shifts said optical unit and said support means to adjust focal points for said microscope, wherein said optical unit is rotatably attached to said support means and is movable between a position at which said objective lens system faces said loader and another position at which said loader is not in front of said objective lens system.

13. A method for controlling a microscope with a telescopic function comprising the steps of:

(a) providing a microscope with an objective lens system having a positive refractive power and an eyepiece system also having a positive refractive power;

(b) positioning an auxiliary optical member which is removable at an object side of the objective lens system and has an auxiliary lens group having a negative refractive power;

providing said auxiliary optical member with a focal point adjustment mechanism for shifting said auxiliary lens group in a paraxial direction of said auxiliary lens group with respect to said objective lens system; and (c) mounting said focal point adjustment mechanism to said objective lens system to adjust said auxiliary optical member to shift the focal point substantially to infinity, further comprising positioning the objective lens system which comprises, in order from the object to be observed, a first and a second objective lens group, each of said lens groups having a positive refractive power, wherein respective optical paths of said first and second objective lens groups are parallel, and a focal length f of said auxiliary lens group and a focal length f1 of said first object lens group satisfy the following conditional relationship:

$$-0.98<(f/f1)<-0.2$$

14. A method for controlling a microscope with a telescopic function comprising the steps of:

(a) providing a microscope with an objective lens system having a positive refractive power and an eyepiece system also having a positive refractive power;

(b) positioning an auxiliary optical member which is removable at an object side of the objective lens system and has an auxiliary lens group having a negative refractive power;

providing said auxiliary optical member with a focal point adjustment mechanism for shifting said auxiliary lens group in a paraxial direction of said auxiliary lens group with respect to said objective lens system; and (c) mounting said focal point adjustment mechanism to said objective lens system to adjust said auxiliary optical member to shift the focal point substantially to infinity, the additional step of positioning an image plane of said auxiliary lens group alone where the object of said microscope is to be observed, while said focal adjustment mechanism is focused at infinity, and further comprising positioning, in order from the object to be observed, a first and a second objective lens group, each of said lens groups having a positive refractive power, wherein respective optical paths for said first and second objective lens groups are parallel, and a focal length f of said auxiliary lens group and a focal length f1 of said first object lens group satisfy the following conditional relationship:

$$-0.98<(f/f1)<-0.2$$

15. A method for controlling a microscope with a telescopic function comprising the steps of:

(a) providing a microscope with an objective lens system having a positive refractive power and an eyepiece system also having a positive refractive power;

(b) positioning an auxiliary optical member which is removable at an object side of the objective lens system and has an auxiliary lens group having a negative refractive power;

providing said auxiliary optical member with a focal point adjustment mechanism for shifting said auxiliary lens group in a paraxial direction of said auxiliary lens group with respect to said objective lens system; and (c) mounting said focal point adjustment mechanism to said objective lens system to adjust said auxiliary optical member to shift the focal point substantially to infinity, wherein the method further comprises: providing said objective lens system with at least one of a lens group having a positive refractive power and another lens group having a plurality of lens groups, respectively having positive refractive powers and having beam paths between lens groups which are nonparallel, wherein a focal length f of said auxiliary lens group and a distance d between a lens surface, among the lens groups forming said objective lens system closest to the object to be observed by said microscope, and the object, satisfy the following conditional relationship:

$$-0.98<(f/d)<-0.2$$

16. In the method, according to claim 15, the additional step of positioning an image plane of said auxiliary lens group alone where the object of said microscope is to be observed, while said focal adjustment mechanism is focused at infinity.

17. A method for controlling a microscope with a telescopic function comprising the steps of:

(a) providing a microscope with an objective lens system having a positive refractive power and an eyepiece system also having a positive refractive power;

(b) positioning an auxiliary optical member which is removable at an object side of the objective lens system and has an auxiliary lens group having a negative refractive power;

providing said auxiliary optical member with a focal point adjustment mechanism for shifting said auxiliary lens group in a paraxial direction of said auxiliary lens group with respect to said objective lens system; and (c) mounting said focal point adjustment mechanism to said objective lens system to adjust said auxiliary optical member to shift the focal point substantially to infinity, the additional step of positioning an image plane of said auxiliary lens group alone where the object of said microscope is to be observed, while said focal adjustment mechanism is focused at infinity, and further comprising: providing said objective lens system with at least one of a lens group having a positive refractive power and another lens group having a plurality of lens groups, respectively having positive refractive powers and having beam paths between lens groups which are nonparallel, wherein a focal length f of said auxiliary lens group and a distance d between a lens surface, among the lens groups forming said objective lens system closest to the object to be observed by said microscope, and the object, satisfy the following conditional relationship:

$-0.98 < (f/d) < -0.2$

* * * * *